Figure 1:
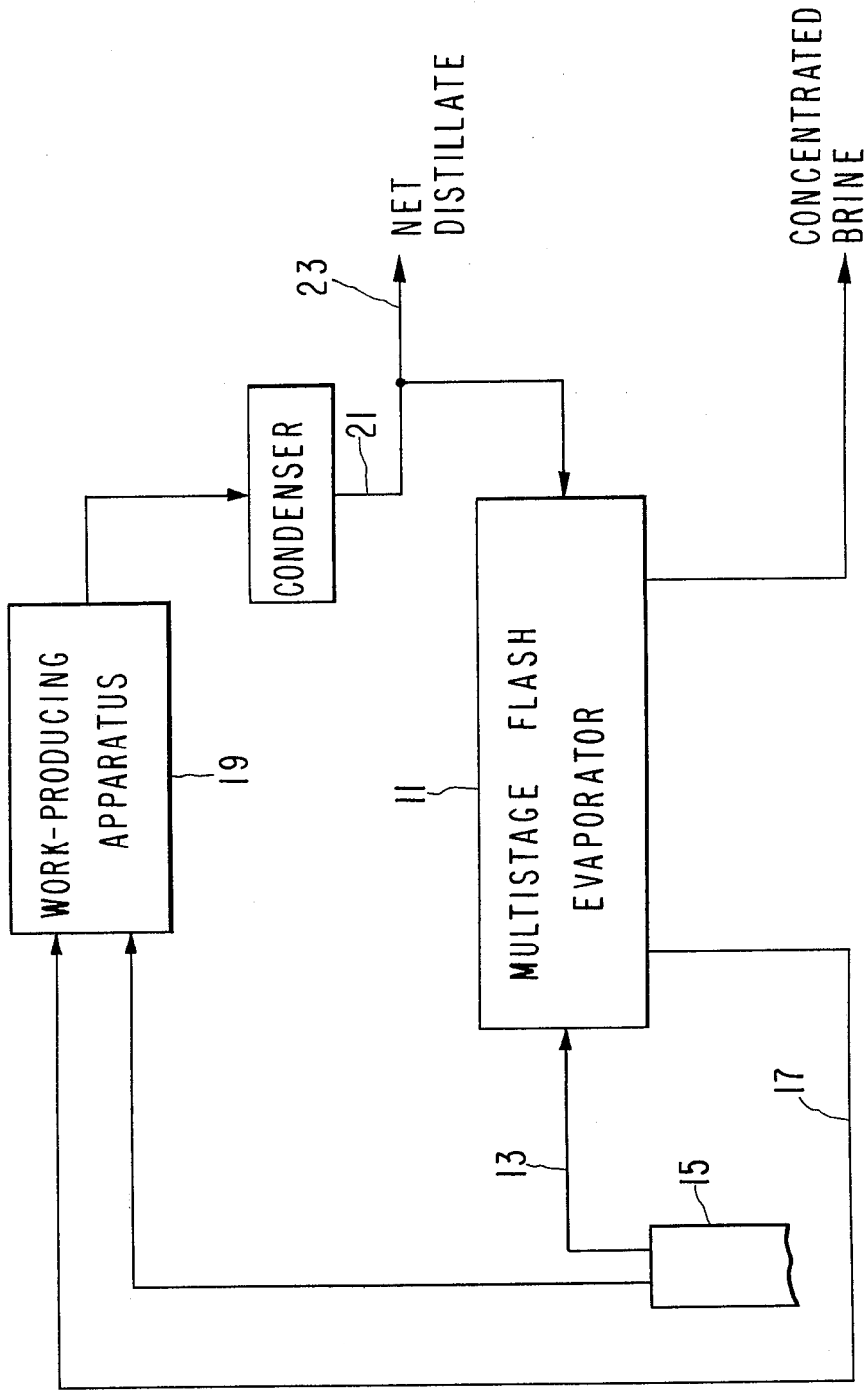

United States Patent [19]
Awerbuch et al.

[11] 3,953,972
[45] May 4, 1976

[54] GEOTHERMAL ENERGY RECOVERY PROCESS

[75] Inventors: Leon Awerbuch, San Francisco; Charles T. Draney, Hillsborough, both of Calif.

[73] Assignee: Bechtel International Corporation, San Francisco, Calif.

[22] Filed: Mar. 17, 1975

[21] Appl. No.: 558,974

[52] U.S. Cl. .................................................. 60/641
[51] Int. Cl.² ........................................... F03G 7/00
[58] Field of Search ............................ 60/641, 648

[56] References Cited
UNITED STATES PATENTS 3,862,545  1/1975  Ellis et al. .............................. 60/641

Primary Examiner—Allen M. Ostrager
Attorney, Agent, or Firm—Townsend and Townsend

[57] ABSTRACT

A system and method for utilizing the heat energy of the effluent from a geothermal well. The system includes a surface evaporator which allows a preheated distillate, freed of impurities, to be vaporized by the heat energy of the steam and/or brine from the geothermal well. The resulting vapor is used to drive a power unit such as a multi-stage turbine. The vapor exhausted from the power unit is condensed by any of a number of conventional means. A portion of the condensate is then recycled through the system, wherein it becomes the direct contact condensing medium for the vapor produced by flashing hot geothermal brine in a multi-stage flash evaporator through which the brine and the condensate are passing countercurrently. The vapor thus condensed augments the aforesaid recycled condensate and, together, they constitute the aforementioned distillate entering the surface evaporator and carrying with it the heat energy extracted from the brine in the flash evaporator. The remainder of the condensate from the condenser may be withdrawn from the system and constitutes a product resulting from the practice of the desalination process of the invention. Residual brine is carried off from the multi-stage flash evaporator and contains retrievable salts and other valuable minerals.

33 Claims, 2 Drawing Figures

GEOTHERMAL ENERGY RECOVERY PROCESS

This invention relates to the production of usable power, desalted water, and inorganic salts by the use of steam and brine derived from a geothermal well and, more particularly, to a system and method for producing the foregoing.

BACKGROUND OF THE INVENTION

The use of geothermal energy to provide mechanical work is old; however, the processes involving the use of such energy have, for the most part, been inefficient and counterproductive for one reason or another. Typically, steam and brine from a geothermal well contain impurities which cause deposition of scale on heat transfer surfaces. Also, the steam contains particulates or corrosive gases which cause structural damage to apparatus through which the steam is directed, such as the blades of a turbine. Among the prior disclosures which show the way in which geothermal energy is utilized is included the following U.S. Pat. Nos. 3,021,265; 3,274,769; 3,457,144; 3,470,943; 3,489,652; 3,597,328; 3,681,920 and 3,757,516.

None of the disclosures in the foregoing patents permit efficient utilization of geothermal energy to avoid the problems mentioned above. For this reason, a need has arisen for an improved system and method for utilizing both steam and brine as heat energy sources from a geothermal well to provide useful work yet permit long-term operation of energy recovery devices which are combined to form such a system.

SUMMARY OF THE INVENTION

The present invention is directed to a system and method which satisfies the above-mentioned need by providing a process for the production of usable power. Inherent in the practice of the process of the invention is the production of desalted water and inorganic salts from the steam and brine discharged from a geothermal well. To this end, the invention utilizes the heat energy from a geothermal source to form a vapor or liquid or liquid and vapor essentially free of foreign particles and corrosive gases wherein the vapor can be used to contact directly the various surfaces of work-producing structure, such as turbines and the like, all of which occurs without causing structural damage to such structure. The system also utilizes the heat energy from the brine of a geothermal well by causing the flashing of the brine in a series of chambers of a multi-stage flash evaporator having different temperatures and pressure, so that the resulting vapor can be used not only to augment the volume of a distillate to be subsequently used as the source of the vapor directed to the aforesaid devices, but also the vapor from the flashing can be used to preheat such distillate to thereby reduce the sensible heat of the brine. As a result, the brine can be reduced to a concentrated condition and discharged as blowdown brine containing crystals of valuable minerals and/or inorganic salts. The preheating of the distillate by the flashed vapor occurs because the flashed vapor directly contacts the distillate. Therefore, a minimum of costly heat transfer surfaces are employed in carrying out the teachings of the present invention.

The primary object of the invention is, therefore, to provide a system and method for utilizing the heat energy from a geothermal source in a manner to permit the production of useful work as well as desalted water and valuable crystals in the form of inorganic salts yet, at the same time, the heat energy so derived can be used in a manner to avoid structural damage to work-producing structures, such as turbines and the like.

Another object of the present invention is to provide a system and method of the type described wherein energy from a geothermal source can be utilized in a manner to require only a minimum of metallic heat exchange surfaces to avoid the damaging effects due to either the deposition of scale and corrosive effects from the brine discharged from a geothermal well.

A further object of this invention is to provide a system and method of the aforesaid character wherein the steam from a geothermal well can be used to vaporize a distillate and the brine from such a well can be used for preheatng and increasing the volume of the distillate before the latter is vaporized to thereby assure an efficient process for the recovery of the heat energy from the well while requiring a minimum of heat exchange surfaces.

Other objects of this invention will become apparent as the following specification progresses, reference being had to the accompanying drawings which show several views of the system of this invention.

IN THE DRAWINGS

Figure 2:
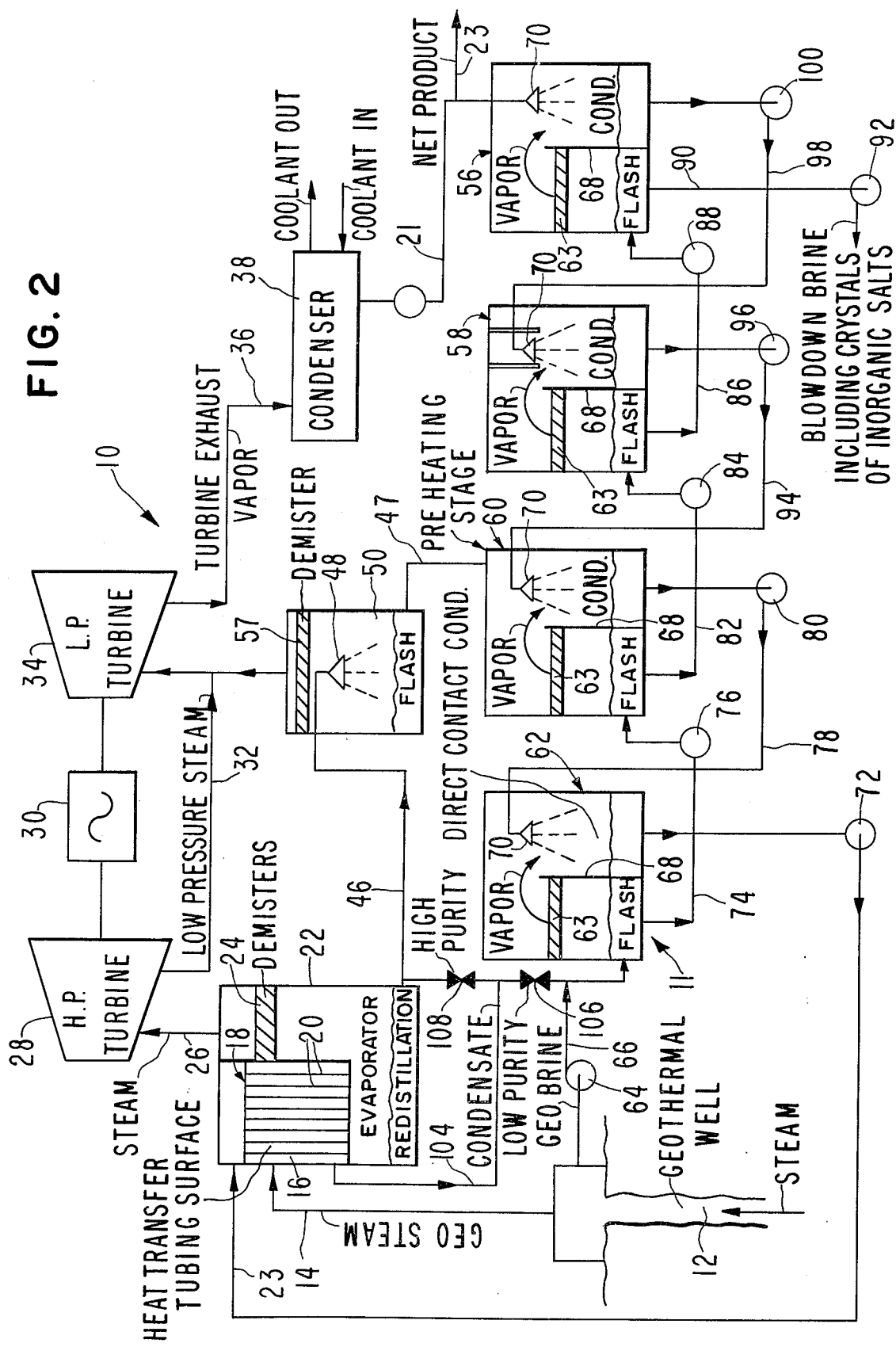

FIG. 1 is a generalized, schematic view of the system of this invention, showing the way in which heat energy from a geothermal source is utilized to produce usable work, desalted water and valuable minerals; and FIG. 2 is a block diagram of a more detailed embodiment of the system.

A generalized version of the present invention is shown in FIG. 1 and includes a multi-stage flash evaporator 11 which receives hot brine from a line 13 coupled to a geothermal source broadly denoted by the numeral 15. Evaporator 11 operates to cause flashing of the brine and the flashed vapor directly contacts distillate flowing through the various stages of the evaporator countercurrently with the flow of hot brine therethrough. The hot distillate emerges from evaporator 11 and flows along path 17 to a point of use, such as to a power unit 19 including a condenser which condenses the hot distillate which then flows along a path 21 back through evaporator 11. A portion of the distillate can be removed along path 23 and be used as desalted water. Moreover, concentrated brine can be removed along path 25 to be used as valuable crystals or minerals. In addition to the hot distillate directed to power unit 19, steam from geothermal source 15 can be directed along line 27 to the power unit to be combined with that of the hot distillate in the event that the impurities, if any, in the steam are not objectionable.

The basic system shown in FIG. 1 is suitable for a wide variety of uses where work is to be produced by the use of the heat energy from the hot brine and steam from the geothermal source. Any one of a number of different power units can be utilized as the work producing apparatus. For instance, the power unit can comprise a high-pressure turbine for driving a generator or the like. Where the fluid to such a turbine is desirably to be kept free of impurities, the steam from the geothermal source will not be sent directly to the power unit but will be passed through a heat exchanger as hereinafter described so that the heat energy from the steam is transferred to the hot distillate coming from evaporator 11. The hot distillate will be substantially free of impurities and can be sent directly to the power unit if desired. While the primary purpose of the system of the present invention is to produce useful work, the production of desalted water and valuable crystals is inherent in the use of the system, thereby assuring additional benefits over and above the useful work produced thereby.

A more detailed version of the system of the present invention is shown in FIG. 2, wherein the system is denoted by the numeral 10. It is adapted to utilize the heat energy from steam and brine taken from a geothermal well through a well bore 12. The steam from well bore 12 is directed along a line 14 to the steam chest 16 of an evaporator 18, such as a vertical tube evaporator. For purposes of illustration, steam chest 16 is comprised of a plurality of vertical tubes 20 which receive a stream of hot distillate directed by way of line 21 into a housing 22 containing evaporator 18. The hot distillate is from a multi-stage flash evaporator 11, the distillate falling in a film on the inner walls of tubes 20.

The steam directed onto the outer surfaces of tubes 20 condenses and, in so doing, heats the distillate passing through the tubes to vaporize the distillate. The vaporized distillate exits from the lower ends of tubes 20, then passes upwardly through a demister 24 which strips droplets of entrained liquid from the vaporized distillate. The vaporized distillate then is directed by a line 26 to the input side of a work-producing structure, such as a high-pressure turbine 28, to drive the latter and thereby drive a power generator 30 or other type of driven unit. Expanded vapor leaves turbine 28 and flows along a line 32 to a low-pressure turbine 34 to drive the latter for the further extraction of work from the heat energy of the vapor. The expanded vapor from turbine 34 passes through a line 36 and enters a condenser 38 of any suitable type which condenses the vapor before it is returned to evaporator 11.

Condenser 38 can be of the direct contact type, can be of shell and tube type, or can be a conventional heat exchanger as is shown in FIG. 2. The coolant flow for the condenser can be from any suitable source, such as a cooling tower.

A portion of the condensed distillate can be removed from the system along line 23. This by-product can be used as desalted water in a number of different applications.

Hot distillate is collected in the bottom of housing 22 and a portion of this distillate is conducted by a line 46 to a flash chamber 50. Vapor generated in chamber 50 joins the vapor from line 32 entering low-pressure turbine 34. A demister 57 in chamber 50 removes droplets of liquid carried by the vapor. The residual distillate from chamber 50 is returned by a line 47 to a corresponding temperature chamber 60 of multi-stage flash evaporator 11.

Relatively cold distillate from condenser 38 passes to a series of flashing-preheating chambers 56, 58, 60 and 62 of multi-stage flash evaporator 11. While only four chambers have been illustrated in the drawing, a fewer or larger number of chambers can be used if desired.

The various flash chambers 56, 58, 60 and 62 operate on the basis of the heat energy from the geothermal brine elevated in well bore 12. Such brine is pumped by a pump 64 through a line 66 to flash chamber 6 which is maintained at a temperature and pressure such that a portion of the brine flashes into vapor which passes through a demister 63 and over a partition 68 in flash chamber 62 for direct and intimate contact with a stream of distillate from a spray head 70 on the opposite side of the partition. The vapor condenses in the distillate stream to augment the volume of the distillate while simultaneously raising its temperature. If desired, the flashed vapor can be washed with a small amount of distillate of the same temperature. The wash water can be collected in a small trough under demisters and can give a separate product of second quality. The distillate in flash chamber 62 is directed by a pump 72 through line 21 and forms the source of distillate directed down through the tubes of evaporator 18.

Brine from flash chamber 62 is directed along a line 74 to flash chamber 60 which also has a demister 63 and a vertical partition 68 over which vapor flashed from the incoming brine passes for direct and intimate contact with the distillate stream from a corresponding head 70 of flash chamber 60. The vapor condenses in the distillate stream to augment its volume while simultaneously raising its temperature. The distillate collected in flash chamber 60 is directed along a line 78 by a pump 80, line 78 being coupled to spray head 70 of flash chamber 62.

Brine from flash chamber 60 is directed along line 82 to flash chamber 58. Similarly, brine from flash chamber 58 is directed along line 86 to flash chamber 56. The brine from flash chamber 56 is directed along a line 90 by a pump 92 to a collection station, the brine being in the form of relatively cool, concentrated blowdown brine which may contain valuable crystals and minerals.

Flash chambers 56 and 58 also have demisters 63, partitions 68 and spray heads 70 as in the case of flash chambers 60 and 62. Distillate from flash chamber 58 is directed along line 94 by a pump 96 to the head 70 of flash chamber 60. Similarly, distillate from flash chamber 56 is directed along line 98 by a pump 100 to head 70 of flash chamber 58. Flashing occurs in flash chambers 56 and 58 as described above with respect to flash chambers 60 and 62 and the flashed vapor in chambers 56 and 58 moves into direct and intimate contact with distillate to not only increase the volume of the distillate but also to increase its temperature as it flows toward the next flash chamber. Head 70 of flash chamber 56 is coupled by a line 21 to condenser 38 for receiving relatively cold distillate therefrom. The brine, in passing from flash chamber to flash chamber, each at a successively lower pressure and temperature than the preceding chamber, moves countercurrently to the stream of distillate.

Flash evaporator 11 is provided with an exhaust system for venting non-condensible gases which enter the system with the geothermal fluid or by inleakage. Said exhaust system, which is not shown in the FIGURES, is of the conventional type, in which chambers operating above atmospheric pressure are vented directly to the atmosphere while those below atmospheric pressure are evacuated by means of pumps or steam jets.

Condensed geothermal steam leaving tubes 20 of steam chest 16 is collected in housing 22 and directed along a line 104. This condensate can join the brine as it is directed along line 66 to flash chamber 62, or, if it is pure, the condensate can be directed to line 46 to be joined with the flashing distillate directed to head 48 of flash chamber 50. Valves 106 and 108 are provided to control the flow of this distillate.

A number of variations in the details of the process described above are possible without departing from the spirit of this invention. Such variations include:

1. Evaporator 18 receiving the geothermal steam may have its tubes vertical, as described, or the tubes may be horizontal.

2. In the embodiment described above, the vapor flashed from the brine is condensed by direct contact with cooled distillate. Another alternative is the use of a water immiscible fluid or fluid immiscible in water at low temperature as a direct-contact coolant. When such a fluid is employed, a typical separation method must be used to cleanly separate the distilled water from the immiscible fluid. When distillate is employed, the cooling tower may be of the wet type or the dry type. If the coolant is a water-immiscible fluid, it is preferred to employ the so-called dry type of tower so as to minimize losses of said immiscible fluid.

3. A number of different types of work-producing structures can use the energy derived from system 10, such as turbine generators, liquid expanders, total flow systems or mixed phase expanders, helical rotary screw expanders and the like.

The process as herein described has wide applicability. It will function satisfactorily on a very saline geothermal brine of high salinity approximating the composition of Salton sea brines containing as much as 30 percent by weight of total dissolved solids. It will function equally well with geothermal sources of high temperature as with those at intermediate temperatures, some of them at a temperature as low as 150°F.

A previously proposed system for the production of power from a heat source containing corrosive or scaling constituents is the so-called "binary fluid cycle". In this system, heat from the brine is transferred to a second fluid in a tubular heat exchanger. The vapor generated in the tubular heat exchanger is expanded through a turbine. Vapor from the turbine exhaust is condensed and waste heat removed. The condensate is returned to the heat exchanger to complete the secondary fluid cycle. This type could allow trouble-free operation of the turbine; however, its use presents problems of scaling, mineral precipitation, and the inefficiency of large terminal temperature differences in the tubular heat exchanger.

Other systems such as simple flash or total flow systems are based on heat from a corrosion- and scale-resistant source or on the use of impulse turbines, therefore, such systems are limited in their applicability.

Thus, it is seen that system 10 provides an efficient process for the generation of power and the production of distilled water and valuable salts from a geothermal source while avoiding the deposition of scale on heat transfer surfaces and avoiding contact of turbine blades with vapors containing particulates or corrosive gases by venting them during formation, said process employing a minimum of costly heat transfer surfaces.

We claim:

1. In a system for using the heat energy from the brine from a geothermal well: a multi-stage flash evaporator of the direct contact type having inlet means at one end thereof for receiving a distillate and outlet means at the opposite end thereof for allowing a fluid including said distillate to be discharged therefrom; means coupled with said outlet means for placing the flash evaporator in fluid communication with a fluid-actuated, work-producing apparatus, whereby the fluid can be directed to said apparatus for actuating the same; and means coupled with the evaporator for connecting the same to a geothermal well so that brine therefrom can be directed into the evaporator, the latter having means for directing the brine in countercurrent, heat transfer relationship to the flow of distillate therethrough.

2. In a system as set forth in claim 1, wherein is included a condenser having a fluid outlet coupled to the inlet means of the evaporator, the condenser having a fluid inlet for receiving a vapor and being operable to produce the said distillate prior to its reaching the inlet means of the flash evaporator.

3. In a system as set forth in claim 1, wherein is included a fluid-actuated, work-producing apparatus, said placing means being coupled with said apparatus so that fluid can be directed thereto to actuate the same, and means connecting said apparatus in fluid communication with said inlet means of the flash evaporator so that at least a portion of the fluid directed to the apparatus can be returned to the flash evaporator.

4. In a system as set forth in claim 3, wherein said connecting means includes a condenser for converting the said fluid to a distillate prior to at least a portion thereof flowing to the said inlet means.

5. In combination: a geothermal well from which geothermal brine can flow; a multi-stage flash evaporator of the direct contact type having inlet means at one end thereof for receiving a distillate and outlet means at the opposite end thereof for allowing a fluid including the distillate to be discharged therefrom; means coupled with said outlet means for placing the flash evaporator in fluid communication with a fluid-actuated, work-producing apparatus, whereby the fluid from said outlet means can be directed to said apparatus for actuating the same; and means interconnecting the geothermal well and said flash evaporator so that brine from said well can be directed into said evaporator and flashed in the stages thereof to produce vapor movable into direct contact with the distillate flowing therethrough, said flash evaporator having means for directing the brine in countercurrent, heat transfer relationship to the flow of distillate therethrough.

6. The combination of claim 5, wherein said placing means includes a heat exchanger and conduit means coupled with the well and the heat exchanger for directing geothermal steam from said well into heat exchange relationship to the fluid flowing toward said apparatus.

7. The combination as set forth in claim 5, wherein is included a fluid-actuated, work-producing apparatus, said placing means being coupled with said apparatus so that fluid can be directed thereto to actuate the same, and means connecting said apparatus in fluid communication with said inlet means of the flash evaporator so that at least a portion of the fluid directed by said placing means to the apparatus can be returned to said flash evaporator.

8. The combination of claim 7, wherein said connecting means includes a condenser converting the said fluid to a distillate prior to at least a portion thereof flowing to the said inlet means.

9. The combination of claim 7, wherein said connecting means has a fluid line extending therefrom to permit removal of a portion of the distillate therefrom for use as a by-product.

10. The combination of claim 5, wherein said flash evaporator has a plurality of means along the path of flow of brine therethrough for removing therefrom brine having a variety of concentrations and compositions.

11. A system for utilizing the heat energy from the steam and brine of a geothermal well comprising: a heat exchanger having means for receiving a distillate and for collecting the vapor therefrom when the distillate is heated sufficiently to vaporize the same; means coupled with said heat exchanger for directing geothermal steam from said well into heat exchange relationship to the distillate flowing therethrough to thereby cause the distillate to become heated and vaporized by the heat energy of the steam; means coupled with said collecting means for passing the vaporized distillate to a location at which work can be produced; a condenser for receiving the vaporized distillate after it has passed to said location and has caused work to be produced; a multi-stage flash evaporator of the direct contact type, said flash evaporator having a plurality of series-coupled flash chambers; means coupled with said flash evaporator for causing distillate to flow therethrough in one direction; means coupled with the upstream flash chamber with countercurrent reference to the distillate flow for connecting the same to said well to permit geothermal brine to flow from the well to and through said flash evaporator, the latter having first means permitting the flow of brine therethrough to be in countercurrent relationship to the flow of distillate therethrough and second means for allowing flashed vapor from the brine to contact the distillate directly to augment the volume of the distillate and to increase its temperature; and means coupled with said upstream chamber for directing a fluid therefrom to a fluid-actuated, work-producing apparatus.

12. A system for utilizing the heat energy from the steam and brine of a geothermal well comprising: a heat exchanger having a plurality of tubes for receiving a distillate; a housing coupled with the heat exchanger for collecting distillate vapor therefrom when the distillate is heated in the tubes sufficiently to at least partially vaporize the same; a first conduit coupled with said heat exchanger and adapted to be coupled to the geothermal well for directing geothermal steam into heat exchange relationship to the tubes to thereby cause the distillate to become at least partially vaporized; a fluid-actuated work-producing apparatus; a second conduit coupled with said housing for carrying distillate vapor to said apparatus so that work can be produced thereby; a condenser for receiving a fluid exhausted from said apparatus; a multi-stage flash evaporator having a plurality of flash chambers, each flash chamber having a partition therein for dividing the same into two regions with said regions being in fluid communication with each other as to their vapor spaces; means placing the flash chambers in series relationship to each other, one of said flash chambers being coupled with said condenser for receiving distillate therefrom for flow through the flash evaporator; a first structure coupled to the upstream flash chamber with countercurrent reference to the distillate flow for pumping distillate to said tubes of the evaporator; a third conduit coupled to said upstream flash chamber and adapted to be coupled to said geothermal well for directing geothermal brine to said upstream flash chamber; and second structure coupled to said flash chambers for flowing brine therethrough in countercurrent, heat exchange relationship to the flow of distillate therethrough, the pressure in each flash chamber permitting the incoming brine thereto to flash, the partition in each flash chamber permitting the flashed vapor to move into direct contact with the flow of distillate therein to condense the said flashed vapor thereby augmenting the volume of said distillate and raising the temperature thereof.

13. A process for extracting the heat energy from the brine from a geothermal well comprising: moving a distillate along a first part in one direction through first portions of a series of chambers having progressively higher temperatures and pressures in said direction; directing a flow of brine from a geothermal well along a second path through second portions of the chambers in countercurrent relationship to the flow of distillate along the first path with the brine being capable of flashing to form a vapor in each chamber; allowing the flashed vapor of each chamber to contact the distillate directly in the first portion of the corresponding chamber; and directing a fluid including the distillate from the downstream chamber with reference to the flow of distillate and along a third path toward a work-producing station.

14. A process as set forth in claim 13, wherein is included the step of reducing the temperature of the distillate before the same enters the upstream chamber with reference to the distillate flow.

15. A process as set forth in claim 13, wherein is included the step of removing a portion of the fluid for use as a by-product before it flows along said first path.

16. A process as set forth in claim 13, wherein is included the step of removing concentrated brine from the upstream chamber with reference to said distillate flow.

17. A process as set forth in claim 13, wherein the flashed vapor is stripped of liquid particles before the vapor contacts the distillate in each chamber, respectively, and wherein the distillate is sprayed into the first portion of each chamber, respectively.

18. The process as set forth in claim 13, wherein is included the step of directing the distillate flowing along the third path through a work-producing station, and returning at least a portion of said distillate from said station to the upstream chamber with reference to said distillate flow.

19. A process as set forth in claim 13, wherein is included the step of removing heat from the fluid as it flows between said station and said upstream chamber.

20. A process as set forth in claim 13, wherein is included the step of placing steam from said geothermal well in heat exchange relationship to the fluid flowing along said third path to increase the heat energy content thereof.

21. A process as set forth in claim 13, wherein the fluid flowing along the third path is in liquid form.

22. A process as set forth in claim 13, wherein the fluid flowing along the third path is in the form of liquid and vapor.

23. A process as set forth in claim 13, wherein the fluid flowing along at least a portion of said third path is in vapor form only.

24. A method of utilizing the heat energy of steam and brine from a geothermal well comprising: causing a quantity of brine from a geothermal well to flow successively through first portions of a series of flash chambers; directing a flow of distillate successively through second portions of said flash chambers in countercurrent relationship to the flow of brine through said first portions, the first and second portions of each flash chamber being in fluid communication with each other, the pressures and temperatures of the flash chambers being progressively higher in the direction of flow of distillate therethrough so that a part of the brine entering each flash chamber will flash into vapor and the vapor will move into direct contact with the distillate to augment its volume and increase its temperature; conveying a fluid including the distillate from the downstream chamber with reference to said distillate flow along a path toward a work-producing station; and directing steam from said geothermal well into heat exchange relationship to the fluid flowing along said path to increase the usable heat content of the fluid.

25. A method as set forth in claim 24, wherein is included the steps of moving the fluid used at said station to the upstream chamber with reference to the flow of distillate, and removing the heat from said distillate as it flows between said station and said upstream chamber.

26. A method as set forth in claim 24, wherein is included the step of collecting the condensate caused by the condensing of the geothermal steam due to heat exchange with the fluid flowing along said path, and directing the condensate to the first portion of said downstream chamber.

27. A method as set forth in claim 24, wherein is included the step of evacuating non-condensable gases in the space immediately surrounding the location at which the distillate is directed into said second portion of each chamber, respectively.

28. A method as set forth in claim 24, wherein is included the steps of collecting concentrated brine in the first portion of one of the chambers, and directing a portion of the concentrated brine to said flow of brine to thereby provide crystals on which other crystals from the brine flow can precipitate.

29. A method as set forth in claim 28, wherein is included the step of removing the crystals from the second path to achieve a variety of crystal products.

30. A method as set forth in claim 24, wherein is included the step of providing said chambers in a common location so that the same are immediately adjacent to each other.

31. A method as set forth in claim 24, wherein the brine is flashed at an upper region of each first portion and the first portions increase in elevation progressively from the relatively hot end of the group of first portions to the relative cool end thereof so that the mechanical energy liberated during flashing in the first portions is used to raise the level of the brine therein to allow the distillate condensed therein to flow countercurrently with the brine without the use of a pumping action.

32. A method as set forth in claim 24, wherein is included the steps of eliminating mist from the flashed vapor from the brine in the first portion of each flash chamber, respectively, before the flashed vapor moves into direct contact with the distillate flow in the adjacent second portion, washing the flashed vapor with a part of said distillate, and collecting said distillate part for use as a by-product.

33. A method as set forth in claim 24, wherein is included the step of moving the fluid through a turbine generator.

* * * * *